April 30, 1957 D. S. HORSLEY 2,790,348
INDICATOR TO FACILITATE IDENTIFICATION OF
RIGHT AND LEFT STEREOSCOPIC FILM STRIPS
Filed April 24, 1953
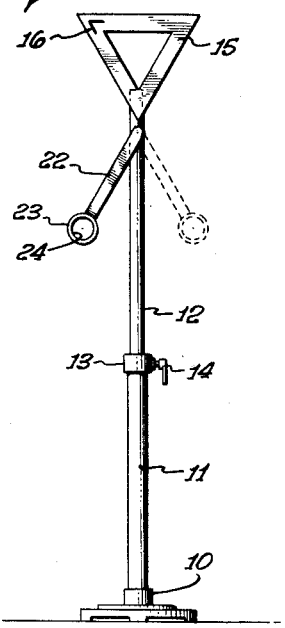
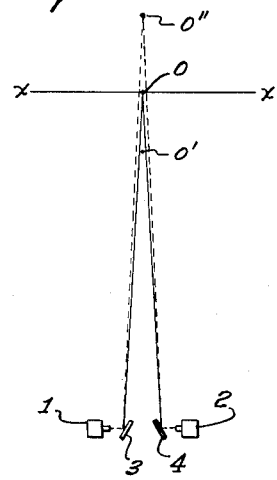
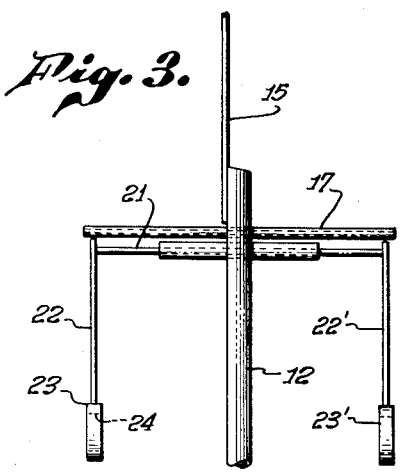
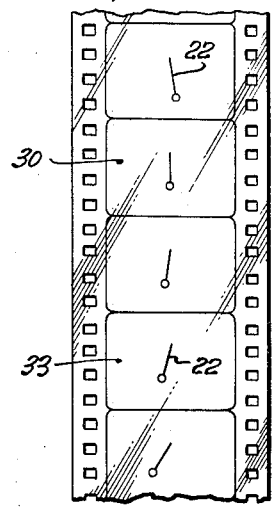
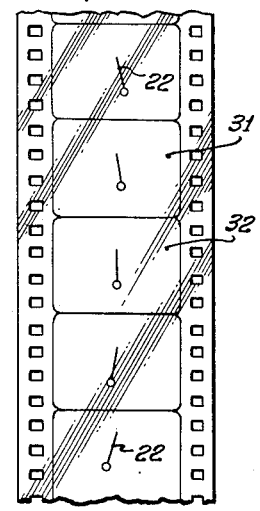
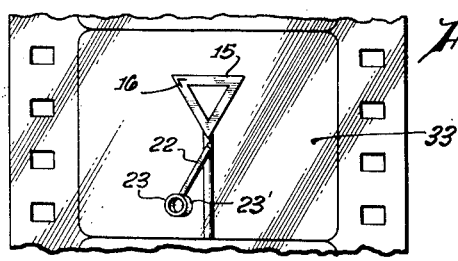
INVENTOR.
DAVID STANLEY HORSLEY,
BY
ATTORNEY.

United States Patent Office 2,790,348
Patented Apr. 30, 1957

2,790,348

INDICATOR TO FACILITATE IDENTIFICATION OF RIGHT AND LEFT STEREOSCOPIC FILM STRIPS

David Stanley Horsley, North Hollywood, Calif., assignor to Universal Pictures Company, Inc., Universal City, Calif., a corporation of Delaware Application April 24, 1953, Serial No. 350,907

1 Claim. (Cl. 88—16.6)

This invention relates to methods for facilitating the production and identification of stereoscopic motion picture films, to photographic strip film bearing representations which permit identification of such films as to the point of view from which such film was photographed, leader portions for stereoscopic motion picture films bearing representations which permit accurate correlation of separate strip films as to stereoscopic pairs, and to means and devices adapted for use in the performance of the method and in the production of such films.

Although many patents and publications have been devoted to the production of stereoscopic motion pictures and the fundamentals are well known (see, for example, Journal of the Optical Society of America, April 1941, pages 325–334; Transactions S. M. P. E., February 1927, pages 326–343 and patents there cited; Kriebel on stereoscopic photography in "The Complete Photographer," 1943, pages 3307–3317, etc.), numerous problems arise in the commercial production of three-dimensional stereoscopic motion picture films. For example, in the production of stereoscopic motion pictures by a photographic method whereby two separate strips of film are obtained, one bearing left eye images and the other bearing right eye images (the two films being obtained by photographing a field from horizontally spaced points of view), it is necessary that the two films be properly synchronized with an accompanying sound track and with each other so that during subsequent simultaneous projection of the two strips of film, stereoscopic pairs are projected. Moreover, it is necessary that each of said strips of film be properly identified as to whether it contains left eye images or right eye images, since it is imperative that the proper film strip be introduced into the proper projecting device.

A considerable amount of time may be spent by technicians in minutely examining frames of film strips for the purpose of ascertaining whether they are right or left images and in properly aligning the films so that stereoscopic pairs are projected. The methods and devices of the present invention eliminate this tedious, time-consuming, microscopic examination and permit the laboratory technicians, cutters, and other engaged in the production of motion picture films to instantaneously identify and readily correlate these very similar but distinctively different films.

It is an object of the present invention, therefore, to disclose and provide a method of facilitating the production and identification of stereoscopic motion picture films.

A further object of the invention is to disclose and provide a leader portion for stereoscopic motion picture films, such leader bearing identifying indicia and representations which readily permit the proper identification of such films.

A still further object of the invention is to disclose and provide means and devices which greatly facilitate the work of the producer or cameraman and permit him to attain desired results.

These and various other objects and advantages of the present invention will become apparent to those skilled in this art from the following description and examples. For purposes of illustration, reference will be had to the appended drawings, wherein:

Fig. 1 diagrammatically illustrates a typical photographic arrangement utilized in the production of stereoscopic motion pictures.

Fig. 2 is a front view of a vertical axis and plane indicator provided with an image index.

Fig. 3 is an enlarged side view of the device shown in Fig. 2.

Figs. 4 and 5 are sections from leader portions of two films made in accordance with the present invention.

Fig. 6 is an enlarged view of one of the frames of a leader portion.

Although various arrangements of cameras may be employed in producing stereoscopic motion pictures, an arrangement which is eminently suited for the production of two separate motion picture films taken from different points of view, one of said films bearing left eye images and the other bearing right eye images, is illustrated in Fig. 1. As there shown, two cameras 1 and 2 are mounted upon a suitable bar with their optical axes in alignment and directed toward each other. Between the cameras 1 and 2 are reflecting means 3 and 4. These reflecting means may be mounted for movement toward and away from each other so as to increase or decrease the effective interocular distance of the system. Moreover, means are preferably provided whereby these reflecting elements 3 and 4 may be adjusted so that the effective optical axes of the cameras 1 and 2 may converge at any desired point within the field of view of said cameras. It is to be understood that the two cameras 1 and 2 are suitably interlocked so as to simultaneously photograph, in rapid succession, the objects or scenes within the field of view of such cameras. Two substantially identical strips of film are thus obtained, each bearing a sequence of images, an image on each strip being correlated to a stereoscopic complement carried by the other strip. In the production of commercial films, sound is generally simultaneously recorded upon a separate carrier strip.

As illustrated in Fig. 1, the two cameras and the mirrors may be arranged so that the optical axes converge at a principal object O located in a principal plane X—X which is substantially transverse to such optical axes. It may be generally stated that in most instances this principal plane shall eventually (upon projection) constitute the plane of the viewing screen, although in many instances it is desirable to converge the axes either upon an object O' or upon an object O", depending upon the effect desired. In the event O lies in the so-called screen plane, an object O' will, upon projection, appear to be in front of the screen plane.

It is therefore important that the point of convergence be accurately determined during photography. Furthermore, it is important that the two cameras be horizontal, as otherwise the projected image may not register properly upon the screen. In order to facilitate the production of motion picture films in accordance with this invention, a vertical axis and plane is established in the principal plane of a scene to be photographed and the optical axes from the two spaced points of view (such as the mirrors 3 and 4) are converged upon such vertical and plane indicator.

One form of device found to be of extreme utility in the attainment of the desired objectives is illustrated in Figs. 2 and 3. As there shown, the device is of a portable nature and comprises a base 10 and an upright standard carried thereby, such standard being preferably made of tubular, interlocking sections 11 and 12, the section 12 being capable of telescopic containment within the lower section 11, the height of the entire device being adjustable by means of a suitable clamp or tightening device 13. A simple form of positioning device consists of a transverse removable pin 14 capable of extending through any one of a series of holes formed in the upper member 12.

Carried by the vertical standard is a plane indicator which may be in the form of any readily distinguishable symbol, such as, for example, the triangular element 15 which may be made of any suitable material and firmly attached to the upper part of support element 12. The triangular member 15 is preferably painted a readily distinguishable and photographable color. The plane indicator 15 is preferably plane and when in use is positioned with its face lying in the principal plane of the scene to be photographed.

A device of the character described hereinabove may therefore be positioned in the center of the scene to be photographed and in the principal plane of the action to be depicted, for example, in the location of the object O (Fig. 1). The two cameras 1 and 2 can then be readily focused upon the vertical standard and the plane indicator 15. Since the standard is vertical, the two cameras can be readily adjusted so that the images received by each of them are true superimpositionable images of the plane indicator and the vertical axis.

In addition, however, it has been found desirable to employ an image index so as to permit proper synchronization of the films obtained between cameras 1 and 2. A simple image index may constitute an oscillatable member (or a pair of oscillatable members), this member or members being capable of oscillating in a vertical, transverse plane adjacent the plane indicator. As shown in Figs. 2 and 3, the upper portion 12 of the standard may be provided with a horizontally disposed, hollow bearing sleeve. This bearing sleeve may pass entirely through the upright 12 and be welded thereto. Journalled within the bearing sleeve 20 is a shaft 21, said shaft carrying at each end an image index arm 22 and 22', the lower portion of each index arm carrying an annular target 23. When annular targets are employed, the diameter of the central aperture 24 is preferably equal to or slightly smaller than the width of the ring itself (approximately one-third of the outer diameter of such annulus). Since the bearing sleeve extends in a horizontal direction, perpendicular to the plane of the plane indicator 15, the image indexes 22 will swing in spaced, vertical lines parallel to the plane indicator.

The complete device described hereinabove may be positioned in the principal plane of a scene to be photographed and after the optical systems have been converged upon the vertical axis established by such indicator and properly focused on the plane indicator, the scene may be photographed. The photography of the scene is initiated while the image indexes 22 are oscillating, thereby producing a leader section to the films. The entire device is then removed from the scene and photography of the scene is continued, suitable action taking place as required by dramatic considerations.

The utility of the method and device herein disclosed will be apparent from a consideration of Figs. 4 and 5 which represent leader portions of a pair of films obtained by a photographic arrangement of the character shown in Fig. 1. The oscillating image index 22 appears on both strips of film in various angular positions. It is quite evident by the comparison of Figs. 4 and 5 that, as illustrated in the drawing, the two strips are not in proper horizontal alignment, since frames 30 and 31 do not show the image index in the same angular position.

It is also evident that frames 30 and 32 constitute a stereoscopic pair and therefore film strip 5 should be moved up one frame in order to be in synchronization.

However, a general view of the two strips of films still does not identify them as to which contains the left eye image and which contains the right eye image. This, however, can be readily determined by the examination of a frame wherein the image index is at a maximum angular displacement from the vertical, as for example, in frame 33. When frame 33 is examined (see Fig. 6 for an enlarged view), it will be readily noted that annular target 23 is somewhat to the left of target 23'. This definitely identifies the images carried by the film strip illustrated in Fig. 4 (of which frame 33 is a part) as bearing right eye images. Moreover, by the use of annular targets the displacement of one image index with respect to the other is readily observed, attention being drawn to the limited and restricted field which appears through the port 24 of the front target.

It may also be noted that the face of the plane indicator 15 may carry a suitable identifying indicia such as 16 to one side of the vertical axis of the established by the standards 11 and 12. Those skilled in the art will recognize that by the use of adequate or contrasting coloring and suitable proportioning, the device and its indications may be photographically recorded upon the strip films to provide readily visible and understandable guides for the identification and correlation of the films being produced.

In order to facilitate the positioning of the axis and plane indicator within the field of view of the cameras, the device may be provided with an additional sighting tube 17 extending through upright 12 paralleling the bearing sleeve and perpendicular to the plane of the plane indicator 15. When the device is placed in the field of view, the operator may sight through the tube 17 toward the cameras and preferably toward a point between the two mirrors 3 and 4, so as to insure proper placement of the device with the plane of the indicator 15 transverse to the optical axes which are converging thereupon.

From the description and illustrations given, it will be noted that each film strip, in its leader portion, has been provided with a representation of a principal plane indicator and an oscillating image indicator, whereby each motion picture film may be readily identified as to its point of view and accurately correlated as to stereoscopic pairs.

I claim:

A device for facilitating the production of stereoscopic motion pictures comprising: a portable base provided with a vertical standard; a plane indicator carried by the standard, said plane indicator having a predetermined marginal edge to facilitate focusing thereon; means for orienting said plane indicator transversely with respect to the optical axis of a camera; and a pair of spaced image index members mounted for simultaneous oscillation in spaced planes parallel to the plane of the indicator.

References Cited in the file of this patent

UNITED STATES PATENTS

| 875,333 | Dyer et al. | Dec. 31, 1907 |
| 1,232,504 | Comstock | July 10, 1917 |
| 1,525,037 | Leventhal | Feb. 3, 1925 |
| 1,809,599 | Owens | June 9, 1931 |
| 1,921,470 | Lane | Aug. 8, 1933 |
| 1,940,424 | Lane | Dec. 19, 1933 |
| 2,337,363 | Ames | Dec. 21, 1943 |

FOREIGN PATENTS

| 388,157 | France | Aug. 4, 1908 |